Nov. 22, 1949     J. C. MILLER     2,488,823
FILLER RETAINING DEVICE FOR BINDER COVERS
Filed Nov. 6, 1945
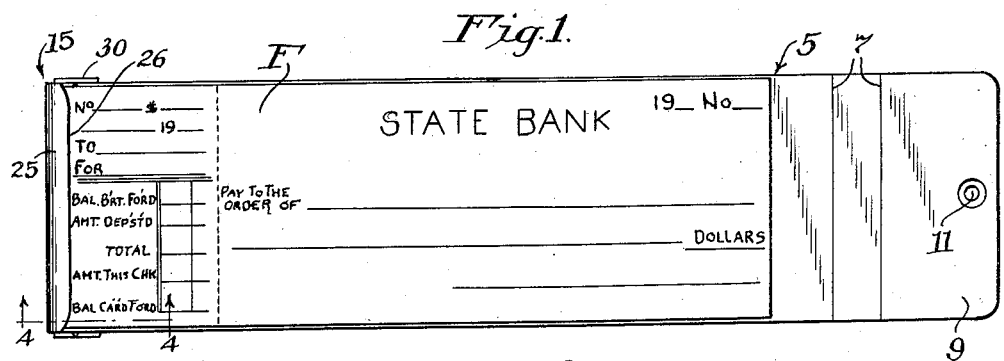
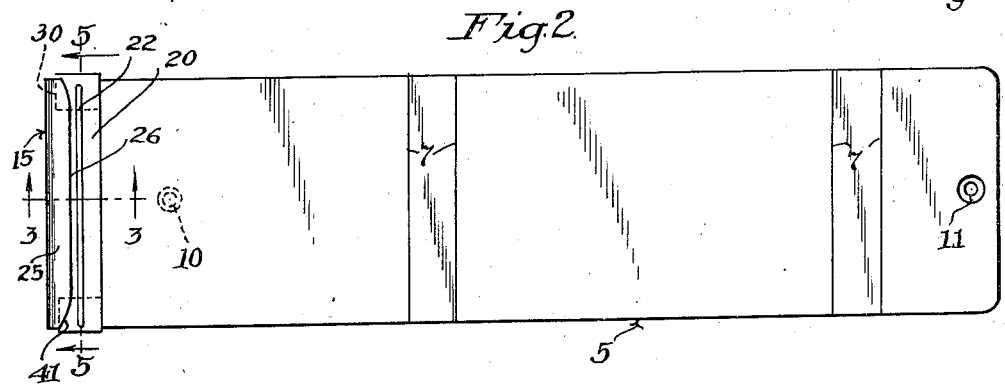
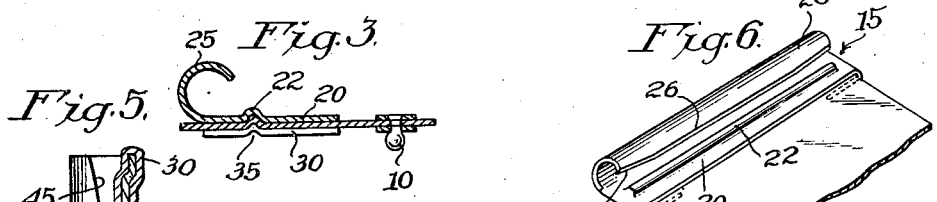
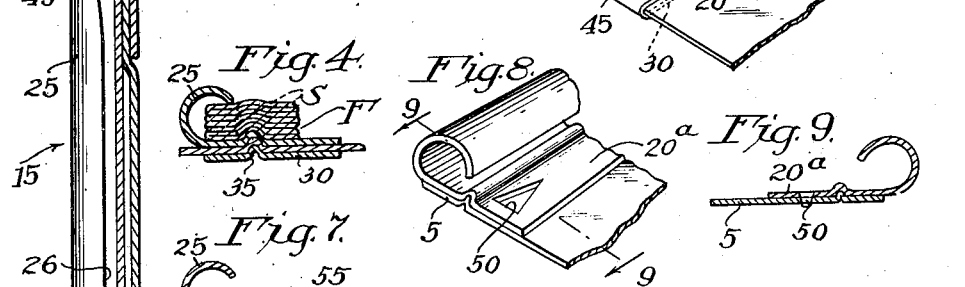
INVENTOR.
Joseph C. Miller
BY
Mason & Graham Patented Nov. 22, 1949

2,488,823

UNITED STATES PATENT OFFICE 2,488,823

FILLER RETAINING DEVICE FOR BINDER COVERS

Joseph C. Miller, Compton, Calif., assignor to Coast Envelope & Leather Products Company, a corporation of California Application November 6, 1945, Serial No. 627,020

1 Claim. (Cl. 281—19)

My present invention has to do with binders, relating more particularly to binders adapted for retaining fillers in check book covers, and the like.

Banks, for instance, usually supply to depositors a relatively permanent check book cover and, from time to time, supply fillers to be mounted in the cover. The fillers consist usually of a plurality of checks and stubs suitably secured together into a pad, as by stapling. Heretofore such fillers have been mounted in such covers by means of a tab on the back of a filler being inserted in a pocket in a cover. Such mounting, however, is relatively expensive, the provision of the pocket and tab rendering it so, and moreover it is not altogether satisfactory in that such mounting does not firmly hold the filler in place. My invention overcomes those objections.

It is an object of my invention to provide a binder capable of securely retaining a filler in place therein and yet one in which the filler may be readily inserted and from which the filler may be readily detached when desired.

In a more specific aspect, one of the features of novelty in my binder, includes the provision of a novel retaining plate curved to facilitate insertion and retention of the filler.

A still further and more specific object of the invention is the provision in the retaining plate of means to effectively secure the filler against accidental escape.

My invention also embodies features of novelty in the simple and efficient means provided for securing the retaining plate on a cover member.

Still further objects will appear from the following description wherein I describe a presently preferred embodiment of the invention and wherein I refer to the accompanying drawings, in which:

Fig. 1 is a top plan view of my device with a filler mounted therein;

Fig. 2 is a view like Fig. 1 but with the filler omitted;

Fig. 3 is an enlarged cross-section view taken on line 3—3 of Fig. 2;

Fig. 4 is an enlarged section on line 4—4 of Fig. 1;

Fig. 5 is an enlarged sectional view taken on line 5—5 of Fig. 2;

Fig. 6 is a fragmentary perspective;

Fig. 7 is a sectional view showing a modified form of the invention;

Fig. 8 is a fragmentary perspective showing a further modified form; and

Fig. 9 is a sectional view of the device of Fig. 8.

It will be understood that, within the broader scope of the invention as defined by the accompanying claim, various modifications and adaptations are possible without departing from the fundamentals of my invention.

Referring now to the drawings, Figs. 1 to 6, inclusive, I show at 5 a cover sheet or binder cover creased along the lines 7 to facilitate folding and to provide a closure flap 9. The closure flap carries the usual fastener element comprising a socket 11 for receiving the somewhat resilient ball shaped projection 10 depending from the bottom surface of the cover member. Such fastening means are well known in the art.

For releasably retaining in the cover sheet a filler element, such as the check book element F shown in Figs. 1 and 4, I provide a retainer plate generally indicated by the numeral 15. The retainer plate, which preferably although not necessarily is made of spring metal or a material having considerable rigidity but which is also slightly resilient, includes a flat front portion 20 having an upwardly embossed transverse bead 22, and terminates at its outer or left-hand end in a curved portion 25, its outer end edge 26 overhanging the flat portion 20 adjacent the embossed bead 22.

To secure the retainer plate on the cover sheet 5 I provide at each side of the flat portion 20 of the plate an ear 30, which ears are bent downwardly and thence inwardly towards each other to clamp over the side edges of the cover sheet. As best shown in Fig. 5, the ears 30 are also upwardly embossed adjacent their inner ends as shown at 35 so as to confine a portion of the cover sheet 5 within the embossed portion 22, and thus more positively prevent escape of the retainer plate from the cover. The embossing 22 also serves the additional function, in cooperation with the end edge 26 of the curved portion 25, of more positively securing the filler F against escape in a direction longitudinally of the cover, or to the right in Fig. 2. The embossed bead 22 is preferably positioned so that the usual row of staples S which bind the check stubs of the filler F together will rest behind the bead (see Fig. 4).

As will be apparent from the foregoing description, to insert the filler F within the retainer plate 15, a side edge of the filler is inserted between the flat plate portion 20 and the overhanging edge 26 and is then pushed laterally until it slides into final position as shown in Fig. 1. In the course of this insertion, the normal thickness of the filler being slightly greater than the clearance between the edge 26 and the flat plate portion 20, the filler will be somewhat compressed and will also slightly flex the curved portion 25 of the retainer member outwardly, so that the filler is then resiliently retained in position.

To facilitate insertion of the filler as above described, the corners of the end edge 26 of the retainer plate are tapered or curved as shown at 45.

In Fig. 7 I show a modified form of device in which the construction is as before described except that, instead of the ears 30, the flat portion of the retainer plate is bent upon itself as shown at 55 and thence around the end of the cover sheet and thence forwardly under the cover sheet as shown at 56, and is embossed at 57.

In Figs. 8 and 9 I show a further modification of my invention, in which the construction is as before described except that instead of the ears 30 or portion 55, I strike out of the flat portion 20a of the retainer plate, adjacent each side, a barb 50, each of which is pointed and passes through the cover sheet 5, being bent over at its outer ends as shown in Fig. 9.

I claim:

A binder for check book fillers and the like, comprising: a cover sheet forming a back support for a filler, and a filler retaining member carried by an end of the cover sheet, said filler retaining member comprising a strip of resilient material bent to provide a substantially flat base portion and an inwardly and downwardly curved outer end portion terminating in a downwardly disposed end edge portion overhanging the base portion a distance less than the thickness of the filler to be retained whereby to resiliently bear against and compress a filler against the base portion, and means for securing the base portion to the cover sheet, said end edge portion intersecting one of the side edges of the outer end portion in a taper.

JOSEPH C. MILLER.

REFERENCES CITED

The following references are of record in the file of this patent:

UNITED STATES PATENTS

| Number | Name | Date |
| --- | --- | --- |
| 227,098 | Cooke | May 4, 1880 |
| 479,014 | McDonald | July 19, 1892 |
| 1,354,960 | Exline | Oct. 5, 1920 |
| 1,528,040 | Wood | Mar. 3, 1925 |